United States Patent [19]

Segawa et al.

[11] 4,242,398
[45] Dec. 30, 1980

[54] FIBROUS SHAPED ARTICLE HAVING NON-LEVEL SURFACE

[75] Inventors: Yasuhiko Segawa; Noritsugu Saiki, both of Iwakuni, Japan

[73] Assignee: Teijin Limited, Japan

[21] Appl. No.: 51,742

[22] Filed: Jun. 25, 1979

[30] Foreign Application Priority Data

Jan. 16, 1979 [JP] Japan .................................. 54-2163
Jan. 16, 1979 [JP] Japan .................................. 54-2164

[51] Int. Cl.³ .......................... B32B 3/26; B32B 5/02; B32B 5/22
[52] U.S. Cl. ...................................... 428/172; 181/284; 181/290; 181/294; 428/215; 428/218; 428/219; 428/286; 428/298; 428/332; 428/337; 428/340; 428/921
[58] Field of Search ............... 428/172, 174, 215, 224, 428/298, 299, 300, 301, 332, 340, 213, 218, 219, 298, 921; 264/258, 319, 324; 156/210; 181/284, 290, 294

[56] References Cited

U.S. PATENT DOCUMENTS 3,050,426  8/1962  Stevens .................. 428/172
4,041,203  8/1977  Brock et al. .............. 428/298

FOREIGN PATENT DOCUMENTS 51-30271   3/1976  Japan .
51-112889  10/1976 Japan .
52-1819    1/1977  Japan .

*Primary Examiner*—Paul J. Thibodeau
*Attorney, Agent, or Firm*—Wenderoth, Lind & Ponack

[57] ABSTRACT

A fibrous shaped article having a surface with raised and depressed portions, said fibrous article consisting of a unitary laminated structure resulting from the compression molding under heat of (A) a heat compression-moldable nonwoven fibrous web and (B) a nonwoven fibrous sheet, said fibrous sheet (B) being laminated to at least one surface of said fibrous web (A); said fibrous web (A) having a compression stress, at 10% compression at the temperature of said compression molding, of at least 0.5 g/cm²; said nonwoven fibrous sheet (B) consisting of a continuous unitary reticulated sheet structure of an assembly of many fibers of a thermoplastic polymer, said constituent fibers having an initial modulus of not more than 5 g/denier and an elongation of at least 20% both at the temperature of said compression molding and being interconnected in a spaced-apart relationship, and said nonwoven fibrous sheet (B) having a plastic deformation ratio, at 30% elongation at the temperature of said compression molding, of at least 50% and an elongation stress, at 30% elongation at the temperature of said compression molding, of not more than 0.15 kg/cm; and said web (A) and said sheet (B) satisfying the following relation:

$$S \leq 0.03\, T$$

in which T is the compression stress (g/cm²) of said web (A) at 10% compression at the temperature of said compression molding, and S is the elongation stress (kg/cm) of said sheet (B) at 30% elongation at the temperature of said compression molding. This article is useful as soundproofing materials, heat insulating materials, cushioning materials, etc.

30 Claims, 2 Drawing Figures

FIBROUS SHAPED ARTICLE HAVING NON-LEVEL SURFACE

This invention relates to a fibrous shaped article having a non-level surface with raised and depressed portions. More specifically, this invention relates to a fibrous shaped article having a non-level surface with raised and depressed portions and resulting from compression molding under heat, which has superior functional properties and aesthetic characteristics and is useful as soundproofing materials, heat insulating materials, cushioning materials, etc.

It is known that a fibrous shaped article obtained by spreading a fibrous assembly of many fibers, mixing it with a thermosetting or thermoplastic resinous binder, and compression-molding the resulting fleece, or nonwoven web, under heat is used as a soundproofing material, heat insulating material, cushioning material, etc. for buildings, vehicles, factory facilities, furniture, etc. However, such a fibrous shaped article composed only of a heat compression-molded structure of a nonwoven web has the defect of possessing poor aesthetic characteristics, developing fuzzes, and exhibiting poor functional characteristics such as abrasion resistance water-proofness and fire retardancy.

Attempts have therefore been made to improve the aesthetic characteristics and/or functional properties of the fibrous shaped article by bonding a sheet-like material such as paper, plastic films, knitted or woven fabrics, or nonwoven fabrics to the surface of the fibrous shaped article. Usually, such a sheet-like material is bonded to the fibrous shaped article by the use of an adhesive. Such a bonding operation is troublesome, especially when the shaped article has a non-level surface. If the sheet-like material does not have sufficient deformability, it cannot conform well to the raised and depressed portions of the surface of the fibrous shaped article, and will result in undesirable surface appearance such as creases, or localized gaps between the sheet-like material and the surface of the fibrous shaped article.

Some methods have recently been suggested for producing a surface-protected fibrous shaped article in one-step by superposing such a sheet-like material as described above on the nonwoven web and consolidating the resulting assembly under heat and pressure (see, for example, Japanese Laid-Open Patent Publications Nos. 30271/76 and 112889/76).

In these known methods, a compact sheet-like material such as a vinyl chloride resin sheet ("vinyl chloride leather"), a rubbery sheet, a polyester film or a polyamide film, or a porous sheet-like material such as a porous paper or cloth impregnated with a thermosetting synthetic resin is suggested as the surface-protecting sheet. The compact sheet-like material usually does not have sufficient heat deformability, and therefore, cannot sufficiently fit portions which are sharply raised and depressed, thus developing creases, or spaces between the sheet-like material and the web surface to which it has been applied, or rendering the sheet-like material itself uneven. Such a sheet-like material also has the defect that its sound absorbing effect is poor because of its low air permeability.

On the other hand, the paper or cloth impregnated with a thermosetting synethetic resin is better than the aforesaid compact sheet-like material, but has low heat deformability and does not give a surface-protected fibrous shaped article having a pleasing appearance.

It is an object of this invention to provide an improved fibrous shaped article which is free from the defects stated hereinabove.

Another object of this invention is to provide a fibrous shaped article having superior aesthetic characteristics.

Still another object of this invention is to provide a fibrous shaped article having a surface with improved functional properties such as abrasion resistance, waterproofness, fire retardancy, smoothness, and weatherability.

These and other objects and advantages of this invention will become more apparent from the following description.

According to this invention, there is provided a fibrous shaped article having a surface with raised and depressed portions, said fibrous article consisting of a unitary laminated structure resulting from the compression molding under heat of (A) a heat compression-moldable nonwoven fibrous web and (B) a nonwoven fibrous sheet, said fibrous sheet (B) being laminated to at least one surface of said fibrous web (A); said fibrous web (A) having a compression stress, at 10% compression at the temperature of said compression molding, of at least 0.5 g/cm$^2$; said nonwoven fibrous sheet (B) consisting of a continuous unitary reticulated sheet structure of an assembly of many fibers of a thermoplastic polymer, said constituent fibers having an initial modulus of not more than 5 g/denier and an elongation of at least 20% both at the temperature of said compression molding and being inter-connected in a spaced-apart relationship, and said nonwoven fibrous sheet (B) having a 7lastic deformation ratio, at 30% elongation at the temperature of said compression molding, of at least 50% and an elongation stress, at 30% elongation at the temperature of said compression molding, of not more than 0.15 kg/cm; and said web (A) and said sheet (B) satisfying the following relation:

$$S \leq 0.3\ T$$

in which T is the compression stress (g/cm$^2$) of said web (A) at 10% compression at the temperature of said compression molding, and S is the elongation stress (kg/cm) of said sheet (B) at 30% elongation at the temperature of said compression molding.

Various technical terms used in the present specification and the appended claims will be defined together hereinbelow.

The fibrous shaped article of this invention is described specifically with reference to the accompanying drawings in which.

Figure 1:
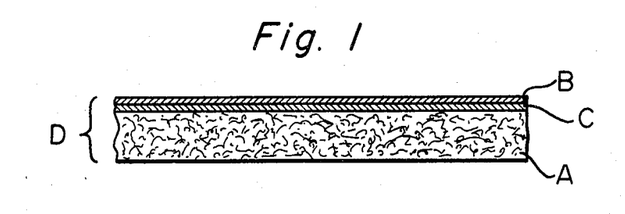
FIG. 1 is a cross-sectional view of a laminate in accordance with this invention before heat compression molding.
Figure 2:
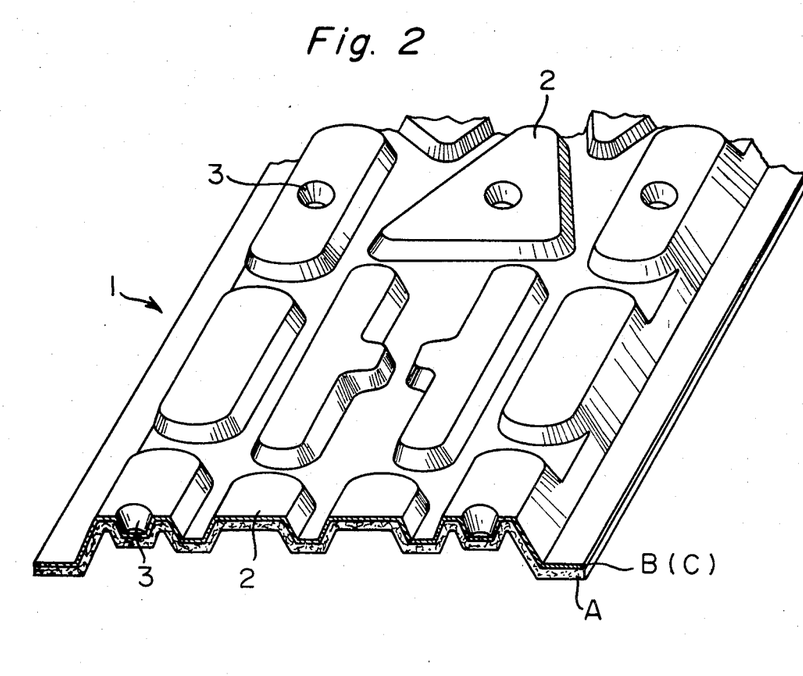
FIG. 2 is a perspective view of one embodiment of the fibrous shaped article of this invention having a surface with raised and depressed portions.

The fibrous shaped article of this invention is produced by compression molding under heat of a laminate (D) composed of a heat compression-moldable nonwoven fibrous web (A) and a nonwoven fibrous sheet (B) (FIG. 1 shows that the sheet (B) is laminated only to one surface of the web (A)), as shown in FIG. 1. FIG. 2 illustrates one example of the raised and depressed condition of the surface of the fibrous shaped article of this invention so molded. The profile of the raised and depressed surface can be varied according to the end use of the fibrous shaped article of this invention.

The characteristic feature of the present invention lies in the selection and combination of materials which constitute the nonwoven fibrous web (A) as a base material and the nonwoven fibrous sheet (B) as a surface material in providing a fibrous shaped article, which is useful as a soundproofing material, a heat insulating material or a cushioning material, by a heat compression-molding technique. Its most characteristic feature consists in the material for the nonwoven fibrous sheet (B). Thus, the web (A) and sheet (B) will be described in greater detail below.

Non-woven fibrous web (A)

The fibrous web (A) is a sheet-like or mat-like nonwoven fibrous material which is a relatively loose fibrous assembly of long fibers and/or short fibers and which has the property of semipermanently retaining the shape imparted thereto by heat compression molding.

The type of the fibers which constitute the fibrous material is not particularly restricted, and natural, regenerated or synthetic organic or inorganic fibers can be used either singly or as mixtures.

Specific examples of these fibers include natural organic fibers such as cotton, flax, or wool; natural or synthetic inorganic fibers such as glass fibers, stainless steel fibers, asbestos fibers or rockwool; regenerated fibers such as rayon and acetate; and synthetic organic fibers such as polyesters, polyamides, acrylic resins and polycarbonate fibers. Suitable fibers have a diameter of usually 1 to 100 microns, preferably 5 to 30 microns.

These fibers should not undergo substantial fusion under the heat compression-molding conditions to be described hereinbelow, and should desirably have a melting temperature of generally at least 200° C., preferably at least 220° C.

These fibers, in the form of short fibers or long fibers or a mixture of short and long fibers, are molded into a nonwoven web. Web formation can be effected by known methods described, for example, in Japanese Patent Publication No. 30827/78, and Guide to Nonwoven Fabrics (INDA), 19(1978).

If the fibrous material constituting the nonwoven web has heat moldability and the property of retaining semipermanently the imparted shape after the heat compression molding, no resinous binder is required. If the fibrous material has little or no such property, it is necessary to include a resinous binder in the fibrous web (A) so as to make the web (A) compression-moldable under heat.

The resinous binder can be incorporated in the fibrous web (A) in the form of a powder, solution or dispersion. The amount of the resinous binder to be incorporated varies according to the type of the resinous binder. Generally, it is at least 5% by weight, preferably about 10 to about 40% by weight, more preferably about 15 to about 30% by weight, based on the weight of the web (A).

The resinous binder used may be a thermoplastic resin which melts at or below the temperature of compression molding, or a thermosetting resin which cures at or below the temperature of compression molding. The thermosetting resin is preferred.

Suitable resinous binders include thermosetting resins such as phenolic resins, epoxy resin, urethane resins, melamine resins and urea resins; polyolefins such as polyethylene, polypropylene, polystyrene, an acrylonitrile/styrene copolymer, an ethylene/vinyl acetate copolymer or an ethylene/metal acrylate copolymer; hotmelt type polyamide resins; and hot-melt type polyester resins.

The shape of the web (A) with or without such a resin binder is not critical, and can be varied widely depending upon the purpose of use, etc. of the final product. Advantageously, it has a thickness of generally about 5 to about 60 mm, preferably about 10 to about 40 mm, and an apparent density of generally about 0.005 to about 0.15 g/cm$^3$, preferably about 0.01 to about 0.1 g/cm$^3$.

The most important requirement of the web (A) used in this invention is that it should have a compression stress, at 10% compression at the temperature of the compression molding, of at least 0.5 g/cm$^2$, preferably at least 1.0 g/cm$^2$, more preferably at least 2.0 g/cm$^2$. If the web (A) has a compression stress, at 10% compression at the temperature of the compression molding, of less than 0.5 g/cm$^2$, it has poor retention of shape after the heat compression molding.

Various known webs can be used as the web (A) in this invention. Examples include "TACA No. 812" and "TACA No. 810" (both products of Nippon Tokushu Toryo Kabushiki Kaisha); a web composed of 80 to 70 parts by weight of refused wool and 20 to 30 parts by weight of an uncured phenolic resin powder (curing temperature 150° C.); a web composed of 40 to 60 parts by weight of refused wool, 40 to 20 parts of waste cotton and 20 to 30 parts by weight of an uncured phenolic resin powder (melting point 185° C.; curing temperature 210° C.); a web composed of 40 to 60 parts by weight of a synthetic resin fiber scrap (melting point more than 200° C.), 40 to 20 parts by weight of waste cotton and 20 to 30 parts by weight of an uncured melamine resin powder (curing temperature 170° C.); a web composed of 80 parts by weight of glass fibers having a diameter of 8 microns and 20 parts by weight of an uncured phenolic resin powder (curing temperature 180° C.); a web composed of 85 parts by weight of glass fibers having a diameter of 12 microns and 15 parts by weight of an uncured melamine resin powder (curing temperature 170° C.); a web composed of 70 parts by weight of short asbestos fibers and 30 parts by weight of an uncured phenolic resin powder (curing temperature 190° C.); a web composed of 60 to 70 parts by weight of polyethylene terephthalate fibers having an average fiber length of about 3cm and 40 to 30 parts by weight of polypropylene fibers having an average fiber length of about 1 cm; a web composed of 60 to 70 parts by weight of nylon 6 fibers having an average fiber length of about 4 cm and 40 to 30 parts of polyethylene fibers having an average fiber length of about 1 cm; and a web composed of 60 to 80 parts by weight of polyethylene terephthalate fibers having an average fiber length of about 5 cm and 40 to 20 parts by weight of a polystyrene powder having an average particle diameter of about 200 microns.

Non-woven fibrous sheet (B)

The nonwoven fibrous sheet (B) are united integrally with the web (A) by heat compression molding to protect the surface of the shaped web (A). The greatest characteristic feature of the invention lies in the use of, as the surface-protecting sheet material, the sheet (B) which consists of a continuous unitary reticulated sheet structure (E) consisting of an assembly of many fibers of a thermoplastic polymer, the individual fibers having an initial modulus of not more than 5 g/denier and an elongation of at least 20% at the temperature of the compression molding and being interconnected in a spaced-apart relationship. Furthermore, the nonwoven fibrous sheet (B) has a plastic deformation ratio at 30% elongation of at least 50%, preferably at least 50%, more preferably 70 to 100%, and an elongation stress at 30% elongation of not more than 0.15 kg/cm, preferably not more than 0.1 kg/cm, more preferably 0.03 to 0.08 kg/cm, both at the temperature of the compression molding.

It has been found in accordance with this invention that the nonwoven fibrous sheet (B) having such a structure and properties as described hereinabove conforms faithfully to the deformation of the web (A) during the heat compression-molding process, and can give a fibrous shaped article having excellent aesthetic characteristics without a gap between the web (A) and the sheet (B), creases in the sheet (B), or thickness unevenness in the sheet (B).

It is important that the reticulated sheet structure (E) which gives such a superior fibrous shaped article should consist of substantially unstretched thermoplastic polymer fibers having an initial modulus of not more than 5 g/denier, preferably not more than 3 g/denier, more preferably not more than 2 g/denier, and an elongation of at least 20%, preferably at least 25%, more preferably at least 30%, both at the temperature of the compression molding, as stated hereinabove.

Thus, any known types of reticulated sheet structure can be used as the reticulated sheet structure (E) used in this invention so long as the fibers constituting the structure have the tensile strengths and elongations specified hereinabove. For example, reticulated or nonwoven sheet structures produced by the following methods can be used in this invention.

(A) A so-called spunbond or spinbond method which comprises continuously extruding a molten thermoplastic polymer from a spinneret, depositing the extruded continuous filaments immediately on a flat surface by the action of air or electrostatic charge (see, for example, U.S. Pat. No. 3,338,992).

(B) A method which comprises extruding a molten thermoplastic polymer containing a blowing agent through an elongated slit having a narrow clearance, and drafting the extrudate almost simultaneously with the extrusion while quenching it (see, for example, Omori et al. U.S. Pat. No. 3,954,928).

(C) A method which comprises extruding a molten thermoplastic polymer through a spinneret, spreading the resulting tow into a flat shape either as filaments or after suitably crimping it, superposing at least two such spread tows, extending the assembly, and pressing it into a sheet form (see, for example, Japanese Patent Publication No. 6795/76).

(D) A method which comprises extruding a molten thermoplastic polymer through a spinneret, and forming the resulting tow, either as such or after being cut, into a web by a dry or wet process (see, for example, Text. World, 121, 78, 1972-6, and Inter. Text. Bull. Spinning, 4, 303, 1969).

Reticulated sheet structures prepared by the methods (B) and (C), especially the method described in (B), are suitable.

The method (B) and the most suitable reticulated sheet structure obtained by this method are described in greater detail hereinbelow.

Advantageously, the reticulated sheet structure in which the constituent fibers have the tensile strength and elongation specified hereinabove can be easily produced by extruding a foamable melt of a thermoplastic polymer through an elongated slit having a narrow clearance not exceeding 500 microns to foam it, drafting the extrudate at a draft ratio between the maximum draft ratio possible under the conditions and one-third thereof while quenching it near the exit of the slit thereby to fibrillate the extrudate, superposing at least two resulting thin fibrous sheets (F), either as such or after being extended in a direction substantially at right angles to the axes of the fibers formed as a result of the fibrillation, and pressing the superposed assembly to form a sheet (this method will be referred to hereinbelow as a "BF method").

The BF method is a unique method developed by the present assignee's company and disclosed in detail in U.S. Pat. No. 3,954,928 to Omori et al. issued May 4, 1976. It should be understood that in the present specification, by reference to this U.S. Patent, the disclosure of the U.S. patent is made a part of the disclosure of the present invention.

The thin fibrous sheet (F) obtained by the BF method is an assembly of a number of fibers of a thermoplastic polymer which are aligned substantially in a fixed direction substantially two-dimensionally, i.e. planarly, and which have the above-specified tensile strength and elongation. The individual constituent fibers are interconnected in a spaced-apart relationship to form a continuous unitary reticulated structure.

The thin fibrous sheet (F) made by the BF method, in the unopened or nonspread state, looks like an assembly of a number of ultrafine fibers arrayed in the direction of the axes of the fibers (longitudinal axes). But when it is spread in a direction at right angles to the longitudinal axes of the fibers (in the transverse direction), the individual fibers are irregularly interconnected at random in a spaced-apart relationship to form a continuous substantially unitary reticulated structure with the individual meshes having nonuniform sizes and shapes.

When the thin fibrous sheet (F) produced by the above method is cut at an arbitrary point in a direction at right angles thereto (at right angles to the axes of the fibers), the individual constituent fibers have asymmetrical irregularly-shaped cross sections of different profiles and sizes, and in addition, each of these fibers has a cross section irregularly varying in profile and size along its axis.

These irregularly-shaped cross sections of the individual fibers are analyzed, and the following observation is made.

The area ($S_f$) of the cross section of each fiber is measured, and the average diameter (Z) of each fiber is expressed by the following equation (1).

$$Z = 2\sqrt{S_f/\pi} \tag{1}$$

wherein $S_f$ is the area of the cross section of each fiber, and $\pi$ is the ratio of the circumference to the diameter of a circle. When the average diameter (Z) is measured on the basis of microphotographs on 100 arbitrary fiber sections, it is preferred that at least 80%, especially at least 90%, of the above fiber cross sections should have an average diameter of from 0.05 micron to 60 microns.

The average value ($Z_{100}$) of the average diameters (Z) of the 100 cross sections is given by the following equation (2).

$$Z_{100} = \left(\sum_{i=1}^{100} Z_i\right) \cdot \frac{1}{100} \qquad (2)$$

Then, $Z_{100}$ is preferably within the range of from 3 microns to 40 microns, especially within the range of from 5 microns to 35 microns.

In the reticulated structure formed by stretching the thin fibrous sheet (F) in a direction at right angles to the fiber axes, the interlocked parts are substantially Y-shaped, and the individual fibers are branched in Y-shape to form irregular meshes having different shapes and sizes from one another.

At least two thin fibrous sheets (F) made by the BF method are superimposed, and formed into the reticulated sheet structure (E).

Desirably, the individual thin fibrous sheets (F) thus superimposed are bonded relatively loosely. It is generally preferred that the laminate of a plurality of thin fibrous sheets (F) should be consolidated under a pressure of 1 to 10 kg/cm$^2$ at a temperature above the softening temperature of the constituent fibers to a temperature lower than their melting temperature, preferably to a temperature at least about 50° C. lower than the melting temperature of the fibers without the aid of a resinous binder.

The fibers constituting the reticulated sheetlike structure (E) used in this invention may be composed of a thermoplastic polymer which does not substantially melt at the temperature of the compression molding to be described hereinbelow. Accordingly, the nonwoven sheet (B) should also desirably have a melting temperature higher than the temperature of the heat compression molding, preferably more than 200° C.

Specific examples of such thermoplastic polymers include polymers having a melting temperature of more than 200° C., e.g. aromatic polyesters such as polybutylene terephthalate, polyethylene terephthalate or polyethylene naphthalate; polyamides such as nylon 6, nylon 66 or nylon 610; bisphenol A-derived polycarbonates; and vinyl fluoride-type polymers; and polymers having a melting temperature of not more than 200° C. such as polyethylene, polypropylene, polystyrene, an acrylonitrile/styrene copolymer, an ethylene/metal acrylate copolymer, polyacetal, aliphatic petroleum resins and aromatic petroleum resins. These polymers can be used either singly or as a blend. Some of the above-exemplified polymers have a lower melting temperature than the temperature of the heat compression molding. However even such lower-melting polymers can be blended with higher-melting polymers to form blended polymers having a higher melting temperature than the temperature of the compression molding. Such blended polymers can also be used in this invention as the thermoplastic polymer.

These thermoplastic polymers may, as required, contain small amounts of conventional additives, for example lead-containing heat stabilizers such as dibasic lead stearate, dibasic lead phosphite, dibasic lead sulfate and lead stearate, metal soaps such as stearates or laurates of barium, cadmium, zinc, calcium or lead, organotin heat stabilizers such as di-n-butyltin maleate and di-n-octyltin maleate, antioxidants such as organic sulfides, organic phosphites, phenols and amines, ultraviolet absorbers such as benzophenone compounds typified by UV-9 ® and UV-24 ®, benzotriazole compounds typified by Tinuvin P ® and Tinuvin 326 ®, acrylate compounds typified by Uvinal N-539 ® and Uvinul N-35 ® and salicylate compounds typified by TBS ®, inorganic pigments such as carbon black, graphite, molybdenum disulfide, titanium dioxide and iron oxide, organic pigments such as anthraquinone compounds and diazo compounds, lubricants such as talc and kaolin, metallic powders such as aluminum and zinc powders, and high viscosity and mixing aids such as paraffin, silicone oil and polyethylene glycol.

The average distance between the interlocked points of the fibers, which defines the size of the meshes of the aforesaid reticulated sheet structure (E), is not strictly restricted. Generally, however, it is desirably within the range of 1 to 50 mm, preferably 5 to 30 mm. It is also preferred that the diameter of each fiber is within the range of 1 to 100 microns, preferably 10 to 50 microns.

The nonwoven fibrous sheet (B) may have a thickness of generally from about 0.06 mm to about 0.2 mm, preferably from about 0.08 mm to about 0.15 mm. Advantageously, the nonwoven sheet (B) has a basis weight of generally 15 to 150 g/m$^2$, preferably 20 to 50 g/m$^2$, although the basis weight is not critical.

Since the nonwoven fibrous sheet (B) functions as a surface-protective material, it desirably has mechanical strengths above certain limits. Specifically, it is desired that the nonwoven fibrous sheet (B) should have a tensile strength of at least 0.1 kg/cm, preferably at least 0.15 kg/cm, more preferably 0.2 to 0.6 kg/cm, and an elongation of at least 5%, preferably at least 10%, more preferably 20 to 80%, both at room temperature.

Furthermore, the nonwoven fibrous sheet (B) may have an apparent density of about 0.2 to about 0.6 g/cm$^3$, preferably from about 0.3 to about 0.5 g/cm$^3$.

If desired, the nonwoven fibrous sheet (B) may be rendered fire-retardant depending upon the use of the fibrous shaped article of this invention. This can be achieved, for example, by a method comprising dipping the nonwoven fibrous sheet (B) in a solution or dispersion of a fire retardant; a method comprising coating the surface of the nonwoven sheet (B) with a solution or dispersion of a fire retardant; or a method which comprises rendering the thin fibrous sheets (F) produced by the BF method fire-retardant by the above methods before lamination, and then laminating the fire-retardant fibrous sheets (F) or a method comprising blending a fire retardant with the molten thermoplastic polymer. Examples of fire retardants that can be used in the above methods are solid fire retardants such as decabromodiphenyl ether, tetrabromobisphenol A and carbonate oligomers thereof, hexabromobenzene, tetrabromophthalic anhydride and perchloropentacyclodecane; and liquid fire retardants such as bromotrichloromethane, tetrabromoethane, 1,2-dibromo-1,1,2,2-tetrachloroethane, tribromopropane and tris-(2,3-dibromopropyl) phosphate. Of these, decabromodiphenyl ether, tetrabromophthalic anhydride, and hexabromobenzene are preferred.

If the nonwoven fibrous sheet (B) adheres to the surface of a mold in the heat compression molding to be described hereinbelow, it will reduce productivity. Desirably, therefore, the nonwoven fibrous sheet (B) should have an adhesion strength of generally not more than 7 g/cm$^2$, preferably not more than 4 g/cm$^2$, with respect to metals at the temperature of the heat compression molding process. When the sheet (B) has a higher adhesion strength than the above-specified value, a mold releasing agent may, as required, be applied to at least that surface of the sheet (B) which is to make contact with the mold. Examples of such a mold releasing agent are polydimethylsiloxane, Teflon particles, liquid paraffin, graphite, and molybdenum disulfide particles.

The non-woven fibrous sheet (B) may optionally be reinforced with reinforcing fibrous materials. Separated spun fibers, non-woven fabrics prepared from such spun fibers, etc. can be used as the reinforcing fibrous materials. Desirably, the reinforcing fibrous materials have a tensile strength of generally at least 0.1 kg/cm, preferably at least 0.2 kg/cm. The sufficient amount of the reinforcing fibrous material to be incorporated in the nonwoven sheet (B) is generally not more than 30% by weight based on the weight of the non-woven sheet (B). An especially preferred type of reinforcing nonwoven fabric is the one disclosed in Japanese Patent Publication No. 6795/76 in which a number of spun fibers laid parallel to one another are bonded at spaced intervals.

Laminated Structure (D)

The nonwoven fibrous sheet (B) described hereinabove is superimposed on one or both surfaces of the nonwoven fibrous web (A) and compression-molded under heat in accordance with this invention. In superposing the web (A) and the sheet (B), it is important to select the web (A) and the sheet (B) such that the compression stress (g/cm$^2$; to be abbreviated "T") of the web (A) at 10% compression at the temperature of the heat compression molding and the elongation stress (kg/cm; to be abbreviated "S") of the sheet (B) at 30% elongation at the temperature of the heat compression molding satisfy the following equation (3).

$$S \leq 0.03T \qquad (3)$$

It has been found in accordance with this invention that when the compression stress T of the web (A) and the elongation stress S of the sheet (B) are in the relation shown by equation (3) above, no crease occurs in the laminated compression-molded structure of the web (A) and the sheet (B) in the vicinity of the boundaries between the raised and depressed portions, nor gaps occur between the web (A) and the sheet (B) at the bottoms of the depressed portions, and that even when heat compression molding is performed at very high deformation ratios (i.e., with sharp projections and depressions), a fibrous shaped article can be obtained which has a very beautiful appearance with clear contours of raised and depressed portions.

Advantageously, the web (A) and the sheet (B) are combined so that they satisfy the following relation:

$$S \leq 0.025T \qquad (3-1)$$

especially $$S \leq 0.02T \qquad (3-2)$$

Some specific examples of such a combination are tabulated below.

Combination 1

(i) Nonwoven fibrous web (A)

A reticulated sheet structure obtained by laminating two or more fibrous sheets (F) prepared from 70% by weight of polyethylene terephthalate and 30% by weight of isotactic polypropylene by the method described in (B) above, spreading the laminate, and pressing it at 140° C. and 10 kg/cm$^2$. The reticulated sheet structure has a basis weight of 37 g/m$^2$, and an elongation stress at 30% elongation of 0.06 kg/cm and a plastic deformation ratio at 30% elongation of 72% when compression-molded at 180° C.

(ii) Nonwoven fibrous sheet (B)

"TACA No. 812" (a trademark for a product of Nippon Tokushu Toryo K.K.; having a compression stress (T) at 10% compression at 180° C. of 5.5 to 8.7 g/cm$^2$).

Combination 2

(i) Nonwoven fibrous web (A)

A reticulated sheet structure obtained by laminating two or more fibrous sheets (F) prepared from a blend of 80% by weight of nylon-6, 10% by weight of isotactic polypropylene and 10% by weight of high-density polyethylene by the method described in (B) above, spreading the laminate and pressing it at 150° C. and 5 kg/cm$^2$. The reticulated sheet structure has a basis weight of 30 g/m$^2$ and an elongation stress (S) at 30% elongation of 0.07 kg/cm and a plastic deformation ratio at 30% elongation of 75% when compression molded at 165° C.

(ii) Nonwoven fibrous sheet (B)

A glass mat composed of 80% by weight of glass filaments having a diameter of 7 microns and 20% by weight of a water-soluble uncured phenolic resin and having an apparent density of 0.012 g/cm$^3$ (a compression stress (T) at 10% compression at 165° C. 0.9–1.5 g/cm$^2$).

Combination 3

(i) Nonwoven fibrous web (A)

A reticulated sheet structure obtained by spinning 100% by weight of polyethylene terephthalate at a spinning speed of 500 m/min. to form 8-denier filaments, bundling them into a tow, spreading the tow in the transverse direction, applying 3.5% by weight of polyacrylate to form a fibrous sheet, laminating two or more such fibrous sheets, spreading the laminate, further applying 3.5% by weight of polyacrylate, and pressing the spread laminate at 180° C. and 10 kg/cm$^2$. The reticulated sheet structure has a basis weight of 40 g/m$^2$ and an elongation stress (S) at 30% elongation of 0.9 kg/cm and a plastic deformation ratio at 30% elongation of 70% when compression molded at 185° C.

(ii) Nonwoven fibrous sheet (B)

A mat having an apparent density of 0.06 g/cm$^3$ and composed of asbestos. The mat has a compression stress (T) at 10% compression at 185° C. of 1.3 to 2.0 g/cm$^2$.

Depending upon the materials of the web (A) and/or the sheet (B), the web (A) and the sheet (B) may be integrally bonded without any intervening bonding material. If required, or preferably, it is convenient to interpose between them a polymeric sheet (C) capable of melting at the temperature of the compression molding.

The polymeric sheet (C) for bonding should desirably have a melting temperature lower than the temperature of the heat compression molding of the laminated structure (D), preferably at least about 5° C. lower than the temperature of the heat compression molding, particularly a melting temperature between about 100° C. and about 180° C. It may be in the form of a film, a perforated film, a nonwoven fabric, a woven fabric, a knitted fabric, etc. Most preferably, a reticulated sheet structure produced from a thermoplastic polymer having a low melting temperature by the method disclosed in U.S. Pat. No. 3,954,928 (BF method) is used as the bonding polymeric sheet (C), and superimposed on the sheet (B), and the resulting laminate is then superposed on the web (A) to form the laminated structure (D).

Suitable materials for the polymeric sheet (C) are, for example, a hot melt-type film or nonwoven fabric composed of polypropylene, polyethylene, an ethylene/vinyl acetate copolymer or an ethylene/metal acrylate copolymer, a film or nonwoven fabric composed of a polyamide-type hot melt polymer, a film or nonwoven fabric composed of a polyester-type hot melt polymer, or a nonwoven fabric composed of an uncured phenolic resin, an uncured melamine resin or an uncured epoxy resin.

The polymeric sheet may have a basis weight of generally about 0.5 to about 100 g/m$^2$, preferably about 1 to about 30 g/m$^2$.

Alternatively, a thermoplastic or heat-curable resin powder having a lower melting temperature or curing temperature than the temperature of the heat compression molding, preferably a melting temperature within the range of about 100° to about 200° C., is used as a bonding material, and spread in an amount of about 5 to about 100 g/m$^2$ on the superposed surface between the web (A) and the sheet (B), and the resulting assembly is then compression-molded under heat.

Compression Molding Under Heat

The laminated structure (D) may be compression molded under heat in a mold in accordance with a method known per se.

The temperature of the heat compression molding is not critical, and can be varied widely according to the types of the web (A) and the sheet (B) used, etc. Needless to say, it must be at least above a point at which the web (A) and the sheet (B) deform under heat. Usually, it is from about 120° C. to a point 10° C. lower than the melting point of the lower-melting one of the web (A) and the sheet (B), particularly from about 150° C. to a point 20° C. lower than the melting temperature of the lower-melting one of the web (A) and the sheet (B).

The compression pressure used at the time of heat compression molding varies according to the properties required of the final fibrous shaped article, the type of the web (A) used, etc., and cannot be definitely set. Usually, pressures of 0.01 to 50 kg/cm$^2$, preferably pressures of 0.02 to 20 kg/cm$^2$, are advantageously used. When the web (A) is composed of inorganic fibers, pressures of 0.01 to 20 kg/cm$^2$, preferably 0.02 to 3 kg/cm$^2$, are suitable, and when the web (A) is composed of organic fibers, pressures of 0.02 to 50 kg/cm$^2$, preferably 0.1 to 20 kg/cm$^2$, are suitable.

Preferably, the compression molding should be carried out so that the degree of compression, i.e. the ratio of the average thickness of the laminated structure (D) before the compression molding to that of the fibrous shaped article, becomes generally (1.1–15):1, preferably (1.5–8):1.

This thickness ratio can be varied from place to place in the same fibrous shaped article. By partly varying the thickness ratio, it can be expected to improve the frequency dependence of the sound absorption ratio or to improve other characteristics.

The heat compression molding can be carried out by using ordinary molds.

Fibrous Shaped Article (D')

The fibrous shaped article provided by this invention has raised and depressed portions at least on one surface of the article which is covered with the sheet (B). As shown in FIG. 2, the surface of the fibrous shaped article 1 is characterized by having a non-level structure composed of a combination of raised portions 2 and depressed portions 3 lower in level than the raised portions. The other surface of the fibrous shaped article may be a uniform flat surface or a non-level surface.

The profiles of the raised and depressed portions are not limited, and can be varied widely according to the end use of the fibrous shaped article. However, in view of the properties of the web (A), it is generally difficult to form a uniform and orderly-shaped molded article having depressed portions which are extremely deep in comparison with the area of their topmost portions. The area of the topmost portions of the depressed portions is equal to the surface area of the sheet (B) side of the laminated structure (D) before the compression molding. Accordingly, in the surface of the fibrous shaped article of this invention, the total surface area of each depressed portion is typically at most 4.0 times, preferably at most 2.5 times, the area of its topmost portion.

The average proportions of the raised and depressed portions in the entire surface of the fibrous shaped article can be shown by the $S/S_o$ ratio wherein $S_o$ is the total surface area of the sheet (B) side of the laminate before molding, and S is the total surface area the non-level sheet (B) side (the same side as above) of the fibrous shaped article after molding. The $S/S_o$ ratio is desirably from 1.01 to 2.0, preferably from 1.03 to 1.7.

In the fibrous shaped article provided by this invention, the web (A) as a substrate and the sheet (B) as a surface material are completely integrated so that the surface of the sheet (B) is free from creases or unevenness, and the contours of the boundaries of the raised and depressed portions are clear to present a very beautiful appearance.

In addition, the fibrous shaped article of this invention has superior properties described below.

The thickness and density of the fibrous shaped article are not critical, and can be varied widely according to the end use of the article. Conveniently, it has a thickness of generally about 1 to 60 mm, preferably about 1.5 to 50 mm. Its suitable density is generally about 0.02 to about 0.5 g/cm$^3$, preferably about 0.05 to about 0.3 g/cm$^3$.

Other typical properties required of the fibrous shaped article of this invention are as follows:
(a) Air permeability
  $>2$ ml.cm$^{-2}$.sec$^-$, preferably $>10$ ml.cm$^{-2}$.sec$^-$
(b) Sound absorption ratio
  100–500 Hz ... $>3\%$, preferably $>5\%$
  500–2000 Hz ... $>3\%$, preferably $>5\%$
  2000 Hz ... $>30\%$, preferably $>70\%$
(c) Flexural strength
  $>0.03$ kg.cm$^{-1}$, preferably $>0.05$ kg.cm$^{-1}$
(d) Modulus of elasticity
  $>0.04$ kg.cm$^{-2}$, preferably $>0.08$ kg.cm$^{-2}$

Utility of the fibrous shaped article

As stated hereinabove, the fibrous shaped article of this invention has superior aesthetic characteristics and functional properties, and can be widely used in various applications including soundproofing materials for buildings and vehicles, particularly a soundproofing plate for an engine room of an automobile, antivibration materials for machines and vehicles, and heat insulating walls for buildings, instrument panels in vehicles, suitcases and cases for electric appliances.

Definition of technical terms (1) Compression stress at 10% compression

Let the thickness of web (A) upon the application of an initial load of 0.05 g/cm² be $d_O$, then the "compression stress at 10% compression" of web (A) is defined as the load (g/cm²) required to reduce the thickness of the web (A) to $0.9d_O$.

This load can be easily measured by securing an attachment for measuring compression stress to an Instron type tensile tester. A circular plate having a diameter of 10 cm is cut out as a measuring sample from web (A), and mounted on the Instron-type tensile tester. At a compression deformation speed of 1 cm/min., the load required to reduce the thickness of web (A) to $0.9d_O$ is measured.

When the web (a) has a thickness of less than 2 cm, such webs are superimposed until the total thickness of the laminate exceeds 2 cm to obtain a measuring sample.

The "compression stress at 10% compression at the temperature of heat compression molding" is defined as the aforesaid load which is measured after heating the sample mounted on the tensile tester to the temperature of heat compression molding of the laminate (D). Heating is done by using an air heating box. The temperature of the sample is measured by a thermocouple having a diameter of not more than 1 mm embedded nearly centrally in the sample. When the temperature of the sample reaches a point just 20° C. below the temperature of heat compression molding, the sample is mounted on the tester. An initial load of 0.05 g/cm² is exerted, and the temperature is raised at a rate of 1 to 5° C./min. When the temperature of the sample reaches the temperature of the heat compression molding, the sample is allowed to stand for one minute, after which the measurement of the load is made.

If the sample is markedly denatured at lower temperatures than the temperature of heat compression molding, and the measured value greatly varies depending upon the rate of temperature rise, the compression stress of the sample at an infinite rate of temperature rise is determined by extrapolation, and made the "compression stress at 10% compression."

The "compression stress at 10% compression", as used in the present application, is an average value of five replicates.

(2) Plastic deformation ratio at 30% elongation and elongation stress at 30% elongation These are measured by an Instron-type tensile tester. A sample, 10 cm long and 5 cm wide, is stretched by about 3 cm at a tensile speed of 10 cm/min., and maintained in this state for 1 minute. The tensile force (kg/cm) per cm width required to maintain this state is defined as the "elongation stress at 30% elongation."

Then, at a speed of 10 cm/min., the tester is returned to the original position. When the tensile force is reduced to 0.002 kg/cm, the distance (b cm) between the chucks of the sample is measured. The "plastic deformation ratio at 30% elongation" is given by the following equation.

$$b - 10/10 \times 100 (\%)$$

The plastic deformation ratio and elongation stress at 30% elongation at the temperature of heat compression molding can be measured by the aforesaid method after the sample mounted on the Instron-type tensile tester is heated to a temperature equal to the temperature of compression molding of the laminate (D). Heating of the sample is usually done by an air heating box.

The sample is mounted on the testing machine as soon as the temperature of the central part of the sample reaches a point just 20° C. below the temperature of compression molding. An initial load of 0.01 kg (a tensile force of 0.002 kg/cm) is exerted, and the temperature is raised at a rate of 1° to 5° C. After the temperature reaches the predetermined temperature and the sample is allowed to stand for one minute, the measurement is started as stated hereinabove.

If the sample is denatured considerably at lower temperatures than the temperature of compression molding and the measured value considerably varies depending upon the rate of temperature rise, the plastic deformation ratio and the elongation stress at an indefinite rate of temperature rise are determined by extrapolation, and made the "plastic deformation ratio and the elongation stress at 30% elongation."

If the measured values differ according to the direction in which the sample is cut out, the plastic deformation ratio at 30% elongation is that of a sample which is cut out in the direction that gives the lowest measured value, and the elongation stress at 30% elongation is that of a sample which is cut out in the direction that gives the highest measured value.

The "plastic deformation ratio at 30% elongation" and the "elongation stress at 30% elongation", in the present application, are average measured values of five replicates.

(3) Tensile strength, initial modulus and elongation

In the case of sheet (B)

A sample, 5 cm wide, is mounted on an Instron tensile tester while adjusting its initial length to 10 cm, and pulled at a tensile speed of 10 cm/min. until it breaks. The maximum strength at breakage is defined as the "strength", and the elongation at this time is defined as the "elongation". The strength and elongation value are number averages of five replicates.

In the case of fiber

A fiber used in the nonwoven fibrous sheet (B) is mounted on an Instron-type tensile tester equipped with an air heating box. The initial length of the sample fiber is adjusted to 0.5 cm, and pulled at a tensile speed of 0.5 cm/min. When these properties are to be measured after heating the fiber sample to the molding temperature, the same methods as in measuring the plastic deformation ratio and elongation stress at 30% elongation are used.

The initial modulus is expressed by the gradient of the tangent to the rising portion of the resulting stress-strain curve. The unit is g/denier. The elongation is the elongation (%) of the fiber at breakage. A number average of five replicates is taken.

(4) Temperature of heat compression molding

The temperature of heat compression molding is the maximum temperature to which the nonwoven fibrous sheet (B) is heated at the time of compression molding under heat. Usually, it is equal to the surface temperature of a mold contacting the nonwoven fibrous sheet (B). This temperature is preferably at least 150° C. but not exceeding a point 20° C. below the melting temperature of the nonwoven fibrous sheet (B), more preferably at least 170° C. but not exceeding a point 30° C. below the melting temperature of the nonwoven fibrous sheet (B).

On the other hand, the surface temperature of a mold contacting the nonwoven fibrous web (A) is preferably at least a point at which the curing or heat fusion of the web (A) begins but not exceeding the melting temperature of the web (A). Usually, it is within the range of 180° to 250° C., preferably 190° to 240° C.

(5) Melting temperature

The sample is placed on a hot plate, and heated at a rate of 10° C./min. The melting temperature of the sample is defined as the temperature at which the sample is melted, and deforms until the original shape is no longer seen.

(6) Apparent density

The apparent density of web (A), sheet (B) or fibrous shaped article (D') is determined in accordance with the following equation on a square sample (each side measuring 10 cm) cut out from the web (A) or sheet (B).

Apparent density $(g/cm^3) = w/100 \times d$ wherein w is the weight (g) of the sample, and d is the thickness (cm) of the sample.

The thickness d of the web (A) is that of web (A) measured when a load of 0.05 g/cm² is exerted on it. The thickness d of sheet (B) and fibrous shaped article (D') is the one measured by a dial thickness gauge. The thickness in either case is measured at five different points, and an average value is taken.

(7) Average distance between interlocked points and the diameter of fiber

These are determined by observing the reticulated sheet structure with a magnifying glass or a microscope. In the reticulated sheet structure, the individual fibers are connected two-dimensionally or three-dimensionally. By taking a photograph of the sheet structure through a magnifying glass of a known magnification ratio, the distance between the interlocked points can be measured. Since the interlocked points have a definite size, the distance between the interlocked points is the distance between the center of one interlocked point and the center of another interlocked point. The "average distance between interlocked points" of the reticulated sheet structure is the number average of 100 replicates.

The "fiber diameter" is determined in accordance with the following equation after measuring the area Sf (average of 100 replicates) of the cross section of the fiber by taking a microphotograph of the fiber cross section.

Fiber diameter $= 2\sqrt{Sf/\pi}$ $\pi$ = the ratio of the circumference to the diameter of a circle (8) Adhesion strength to metal A circular iron plate (A) having a pear skin-like hard chrome-plated layer of 150 mesh and having a diameter of 5.0 cm and a weight of 137 g is placed on the undersurface plate of a press machine. In the meantime, a flat iron plate (B) having a pear skin-like hard chrome-plated layer of 150 mesh is fixed to the top surface plate of the press machine. The flat iron plate (B) is broader than the circular iron plate (A).

The chrome-plated surfaces of the circular plate (A) and the flat plate (B) are maintained at a predetermined measuring temperature. A sample in circular plate form with a diameter of 6.0 cm is placed so as to cover the entire surface of the circular plate (A). The press machine is operated, and the sample is pressed for 1 minute at 10 kg/cm² by means of the circular plate (A) and the flat plate (B) and the load is released. The above operation was repeated five times. When the circular plate (A) can be removed from the flat plate (B) without breakage of the sample at the time of releasing the load, the metal adhesion strength of the sample is defined as not more than 7 g/cm².

(9) Air permeability

Measured in accordance with JIS P8117 using a B-type Gurley DENSOMETER. The air permeability (p) is given by the following equation.

$$p = \frac{100}{5.0 \times 5.0 \times t} = \frac{25}{t} \text{ (ml cm}^{-2} \text{ sec}^{-1})$$

wherein t is the time in seconds required for 100 ml of air to pass through a sample having a cross sectional area of $5.0 \times 5.0$ cm.

(10) Sound absorption ratio

Measured by using a stationary wave method (perpendicular incidence method). A measuring sample is placed in one end of a tube having a diameter of 10 cm, and sonic waves having a fixed frequency are put into the other end of the tube to form stationary waves. The maximum and the minimum of the sonic pressure are measured by a microphone, and the ratio (S) of the maximum amplitude to the minimum amplitude of the stationary waves is determined. The ratio of sound absorption ($\alpha$) is given by the following equation.

$$\text{Ratio of sound absorption } (\alpha) = \frac{4S^2}{(S^2 + 1)^2} \times 100 \text{ (\%)}$$

wherein S is the ratio of the maximum to the minimum of the sonic pressure.

Larger $\alpha$ values indicate better sound absorbability.

(11) Flexural strength and modulus of elasticity

Measured by means of an Instron-type compression stress tester. A sample, $5.0 \times 15$ cm, is placed on two support heads each having a radius of curvature of 0.5 cm and a width of 7.0 cm and spaced from each other by 10 cm. and the central part (the point equidistant (5 cm) from each support head) of the sample is fixed to a stress gauge for measurement of compression stress. The sample is bended at a compression speed of 5.0 cm min.$^{-1}$ using another support head having a radius of curvature of 0.5 cm and a width of 7.0 cm, and the loadflex curve of the sample is plotted. The flexural strength (f) and the modulus of elasticity (e) of the sample are calculated in accordance with the following formulae.

Flexural strength $(f) = F/5$ (kg cm$^{-1}$)

wherein F is the load (kg) at the breakage of the sample.

Modulus of elasticity $(e) = E/5$ wherein E is the load (kg) determined when the initial gradient straight line of the load-flex curve is extended to a flex amount of 1 cm.

(12) Heat moldability

The "heat moldability" in the following Examples is evaluated in the following manner.

Female and male molds which have a radius of 7.5 cm and projecting from the centers thereof include a circular truncated cone having a height of 1.5 cm, a top surface diameter of 2.8 cm, a lower bottom surface diameter of 5.0 cm and an edge radius of curvature of 5 mm are mounted on the bottom and top plates of a press machine (the male mold is fixed to the top plate).

The surfaces of the molds are heated to a predetermined measuring temperature, and a laminate (D) composed of web (A) and sheet (B) is placed on the female mold and pressed. (Unless otherwise specified, the sheet (B) is held by a ring having an inside diameter of 20 cm, and placed on the mold.) Care is taken at this time not to exert the load of the ring on the web (A). After separating the molds, the molded fibrous article is taken out, and visually examined. When heat molding is not performed satisfactorily, the following phenomena occur.

(1) The web (A) and the sheet (B) separate from each other at the circumferential part of each of the top and lower bottom surfaces of the circular truncated cone (this is termed "float").

(2) The sheet (B) becomes thin as a result of deformation (this phenomenon is termed "wear away").

(3) The sheet (B) sticks to the molds and breaks.

(4) Creases occur in that direction of the sheet (B) which is at right angles to the circumference of the circular truncated cone.

After five replicates, a phenomenon which occurs three or more times is recorded. The results are evaluated on the following scale.

◎ ... The phenomena (1) to (4) do not occur in five replicates, and a molded sheet conforming well to the contours of the molds is obtained.

○ ... The phenomena (1) to (3) occur slightly. The extent of occurrence is as follows: In the case of (1) and (2), the extent is less than 1/20 of the circumference at the top or bottom surface where the defect occurs (an average of five replicates). In the case of (3), one or more samples broken in an area of 5 mm² or less occur.

When the phenomena (1) to (4) occur to an extent greater than that expressed by ○, such phenomena should be indicated.

(13) Elongation at the time of heat molding

When the laminate (D) is compression-molded under heat, the sheet (B) stretches or contracts in a certain direction. The proportion (%) of the stretched or contracted length to the original length is defined as the elongation.

This can be determined by marking the surface of the sheet (B) with a line of a certain fixed length, and measuring the length of the line after the heat compression molding, and calculating the ratio of the increase or decrease of the line to the original length.

The following Examples illustrate the present invention in greater detail. It should be understood however that the scope of the invention is not limited to these specific Examples.

The abbreviations used in these Examples have the following meanings.

PET: polyethylene terephthalate
Ny-6: nylon 6
Ny-6,6: nylon 6,6
PP: isotactic polypropylene

EXAMPLE 1

A blend of 69.5% of polyethylene terephthalate chips having an intrinsic viscosity of 0.73, 29.2% of polypropylene, 0.3% of carbon black and 1.0% of talc was placed into a hopper. Hot air at 140° C. was blown into the hopper for 2 hours to dry the chips. The blend was then fed into a screw whose melting zone was maintained at a temperature higher than the melting temperature of polyethylene terephthalate, melted, and transported. Nitrogen at a pressure of 60 kg/cm² was blown from a vent portion, and then in the metering zone, the molten polymers and nitrogen were fully kneaded. The kneaded mixture was passed over a mandrel of the spiral, and discharged at a rate of 60 g/min. from a ring die having a diameter of 16 cm and a slit width of 0.25 mm. While cooling the extrudate with a cooling air, the extrudate was wound up at a speed of 50 m/min. which was 0.8 times the maximum draft. Thus, a reticulated fibrous sheet (PF) having numerous cracks in the wound-up direction was obtained. The sheet was extended to two times the original dimension in the transverse direction and the average distance between the interlocked point and fiber diameter was measured. The average distance between the interlocked points of the resulting sheet was 12 mm, and the fiber diameter was 52 microns. The fibers of this sheet (PF) had an initial modulus of 0.6 g/de and an elongation of 60%, both at 190° C.

Thirty-two such fibrous sheets (PF) were laminated, and extended to 10 times in the transverse direction by feeding the laminate at an overfeed ratio of 1.9. The extended laminate was pressed at 130° C. and 10 kg/cm² to obtain a nonwoven fabric (B) having a basis weight of 40 g/m², a thickness of 110 microns, a strength of 0.3 kg/cm and an elongation of 50% in the machine direction, a strength of 0.2 kg/cm and an elongation of 15% in the transverse direction, and an apparent density of 0.36 g/cm³.

At 190° C., the nonwoven fabric (B) had a plastic deformation ratio at 30% elongation of 73%, and an elongation at stress at 30% elongation of 0.065 kg/cm.

The nonwoven fabric (B) was placed on one surface of a nonwoven fibrous web (A) having a basis weight of 1,200 g/m² and a thickness of 2.5 cm and composed of 20% of uncured phenolic resin particles (the temperature at which these particles begin to cure was 185° C.), 40% of waste cotton and 40% of refused wool, and the heat moldability of these sheets was evaluated by the method described hereinabove (the ratio of depressed portion to raised portions in the entire area 1.05; the ratio of depressed portions to raised portions in the circular truncated cone portion (the deforming portion) 1.48). The male mold was maintained at 190° C., and the female mold, at 230° C. The nonwoven fabric was placed on the male mold, and a spacer was provided so that the thickness of the fibrous shaped article would be 4 mm. The assembly was pressed for 1 minute. The heat moldability of the assembly was very good, and the maximum heat deformation occurred on the side surface of the circular truncated cone. At this portion, the elongation of heat molding was 35%.

The nonwoven fibrous web (A) had a compression stress at 10% compression at 190° C. of 6.3 g/cm².

A nonwoven polypropylene fabric (C) having a basis weight of 3 g/m² was laminated to the nonwoven fabric (B). The nonwoven fibrous web (A) was laminated on the polypropylene nonwoven fabric side. The nonwoven fabric (B) side was maintained at 195° C., and the web (A) side was maintained at 230° C., and the laminate was molded for 1 minute to give an uneven surface having a ratio of depressed portions to raised portions of 1.2. In the resulting fibrous shaped article (D), the web (A) adhered firmly to the nonwoven fabric. The fibrous shaped article (D) had an apparent density of 0.3, and its plain region had a flexural strength of 0.054 kg/cm and a flexural modulus of 0.12 kg/cm², showing superior mechanical properties. The aesthetic characteristics of the nonwoven fibrous fiber (B) side of the shaped article were also superior. The product had a sound absorption ratio of 73% at 3,000 Hz when it was measured after providing a space of 5 cm at the back of the plain region.

EXAMPLES 2 TO 6 AND COMPARATIVE EXAMPLES 1 TO 4

In these examples, each of nonwoven fibrous sheets (B) made of various materials and having various initial moduli and elongations of fibers and various plastic deformation ratios and elongation stresses at 30% elongation, a nonwoven polypropylene fabric (serving as an adhesive) having a basis weight of 3 g/m$^2$ were combined, and the heat moldability of the assembly was evaluated in accordance with the method described hereinabove (the ratio of depressed portions to raised portions of the entire article 1.05; the ratio of depressed portions to raised portions at the circular truncated cone portion (deforming portion) 1.48).

Molding conditions

The nonwoven fibrous sheet (B) was placed on the side of the male mold, and the nonwoven fibrous web (A), on the side of the female mold.

Molding thickness=4 mm (using a spacer of 4 mm)
The molding temperature is shown in the table.
The stress of the nonwoven fibrous web at 10% compression at varying temperatures was as follows:

| 160° C. | 180° C. | 200° C. | 220° C. |
|---|---|---|---|
| 6.7 | 6.0 | 5.3 | 4.3 |

The various nonwoven fibrous sheets (B) used were as follows:

(S) PET-PF28/PET-DF 1

Twenty-eight layers of the (PF) obtained in Example 1 and one layer of a parallel-laid sheet (DF) having a basis weight of 27 g/m$^2$ obtained by spreading a drawn-crimped tow (draw ratio 3.5; the number of crimps 16 per inch) of 2-denier PET monofilaments and applying 4% of polyacrylate, so that (DF) was placed at the center of the laminate. The proportion of the DF was 17%. The laminate was extended, and pressed under the same conditions as above to form a sheet having a basis weight of 42 g/m$^2$ and a thickness of 105 microns.

(S) (Ny-6)-PF 24

A sheet having a basis weight of 28 g/m$^2$ and a thickness of 95 microns which was obtained by melting a blend of 79% of nylon-6 chips having an intrinsic viscosity [η] of 1.3, 19.5% of polypropylene chips, 0.3% of carbon black and 1.2% of talc, blowing nitrogen into the molten blend, and kneading the mixture, extruding the kneaded mixture from a slit having the same profile at a rate of 55 g/min., winding up the extrudate at a rate of 54 m/min. (77% of the maximum draft ratio) to obtain reticulated sheets having cracks and an average distance of interlocked points of 5 mm, laminating 24 layers of these reticulated sheets, feeding the laminate at an overfeed ratio of 1.9, extending it to 6.0 times the original dimension in the transverse direction, and then pressing the extended laminate at 154° C. and 15 kg/cm$^2$.

(S) PET-UF 2

A sheet having a basis weight of 75 g/m$^2$ and a thickness of 130 microns which was obtained by spreading undrawn filaments of PET with a monofilament denier size of 6.5 denier, applying 4% of polyacrylate to the filaments to obtain a parallel-laid filamentary sheet (UF) having a basis weight of 170 g/m$^2$ and an average distance between interlocked points of 4 mm, laminating two such sheets (UF), extending the laminate under the same conditions as in Example 1, further applying 5% of polyacrylate, and pressing the laminate under the same conditions as in Example 1.

(S) (Ny-6)-UF 2

A sheet having a basis weight of 81 g/m$^2$ and a thickness of 138 microns which was obtained by spreading undrawn filaments of Ny-6 having a monofilament denier size of 7.0 denier, applying 4% of polyacrylate to obtain a parallel-laid filamentary sheet (UF) having a basis weight of 190 g/m$^2$ and an average distance between interlocked points of 5 mm, superposing two (UF) sheets, extending the laminate under the same conditions as in Example 1, further applying 5% of polyacrylate, and pressing the laminate at 155° C. and 15 kg/cm$^2$.

(US) PET-PF2

A sheet having a basis weight of 36 g/m$^2$ and a thickness of 105 microns which was obtained by laminating two parallel-laid cracked sheets (PF) obtained in Example 1 without extending them, and pressing the laminate at 130° C. and 5 kg/cm$^2$.

PET-SF

A sheet having a basis weight of 53 g/m$^2$, a thickness of 130 microns which was obtained by cutting a drawn-crimped tow of PET filaments with a monofilament denier of 2 (draw ratio 3.5; the number of crimps 12 per inch) to a length of 5 cm, forming the cut fibers into a web by a dry method, applying polyacrylate ester in an amount of 20%, and pressing the web at 200° C. and 20 kg/cm$^2$.

(S) PET-DF 6

A sheet having a basis weight of 29 g/m$^2$ and a thickness of 100 microns which was obtained by superposing six layers of parallel-laid sheet (DF) having an average distance of interlocked points of 2 mm and used in (S) PET-PF28/PET-DF1, overfeeding the laminate in the same way as in Example 1, extending the laminate, applying polyacrylate so that the final pick-up of the polyacrylate becomes 20%, drying the laminate and pressing it at 200° C. and 15 kg/cm$^2$.

PET film

A 12 micron-thick PET film obtained by stretching to 3 times both in the machine and transverse directions.

(Ny-6)-SB

Nylon-6 was extruded from a nozzle, stretched by an air stream to adjust the monofilament denier of the extrudate to 1.8, and deposited on a wire net by an air stream, and embossed in a network structure with a mesh width of 0.5 mm and a mesh area of 1×1 mm to form a sheet having a basis weight of 27 g/m$^2$ and a thickness of 130 microns.

| Example | Nonwoven fibrous sheet B | Heat molding conditions Mold Temperature (°C.) Male mold | Heat molding conditions Mold Temperature (°C.) Female mold | Heat molding conditions Pressing time (min.) | Initial modulus of fiber (g/de) | At the temperature of the male mold Elongation of fiber (%) | At the temperature of the male mold Plastic deformation ratio at 30% elongation (%) | At the temperature of the male mold Tensile stress at 30% elongation (kg/cm) |
|---|---|---|---|---|---|---|---|---|
| 2 | (S)Pet-PF28/PET-DF1 | 190 | 235 | 1 | 0.6 | 60 | 72 | 0.06 |
| 3 | (S)(Ny-6)OPF24 | 170 | 225 | 1.5 | 0.64 | 70 | 74 | 0.07 |
| 4 | (S)PET-UF2 | 180 | 240 | 1 | 4 | 110 | 68 | 0.10 |
| 5 | (S)(Ny-6)-UF2 | 185 | 235 | 1 | 1.5 | 100 | 70 | 0.11 |
| 6 | (US)PET-PF | 190 | 235 | 1 | 0.6 | 60 | 70 | 0.06 |

| Example | Heat moldability | Properties of the fibrous shaped article Apparatus density (g/cm³) | Properties of the fibrous shaped article Flexural strength (kg/cm) | Properties of the fibrous shaped article Modules of elasticity (kg/cm²) |
|---|---|---|---|---|
| 2 | ⊚ | 0.3 | 0.07 | 0.15 |
| 3 | ⊚ | 0.3 | 0.05 | 0.10 |
| 4 | ○ (float) | 0.3 | 0.06 | 0.13 |
| 5 | ⊚ | 0.3 | 0.06 | 0.12 |
| 6 | ⊚ | 0.3 | 0.06 | 0.14 |

Table 2

| Comparative Example | Nonwoven Fibrous sheet (B) | Heat molding conditions Mold temperature (°C.) Male mold | Heat molding conditions Mold temperature (°C.) Female mold | Heat molding conditions Pressing time (min) | Initial modulus of Fiber (g/de) | At the temperature of the male mold Elongation of Fiber (%) | At the temperature of the male mold Plastic deformation ratio at 30% elongation (%) | At the temperature of the male mold Tensile stress at 30% elongation (kg/cm) |
|---|---|---|---|---|---|---|---|---|
| 1 | PET film | 220 -180 | 235 | 1 | — | — | 45-58 | 0.25 -0.3 |
| 2 | (S)PET-DF 6 | 220 -180 | 235 | 1 | 6-15 | 60 -40 | 65-60 | 0.11 -0.13 |
| 3 | (Ny-6)-SB | 190 -160 | 230 | 1.5 | 3-10 | 25 -10 | Broken | Broken |
| 4 | PET-SF | 220 -180 | 230 | 1 | 7-13 | 55 -42 | 67 | 0.16 |

| Comparative Example | Heat moldability | Properties of the fibrous shaped article Apparent density (g/cm³) | Properties of the fibrous shaped article Flexural strength (kg/cm) | Properties of the fibrous shaped article Modulus of elasticity (kg/cm²) |
|---|---|---|---|---|
| 1 | Float | 0.3 | 0.08 -0.06 | 0.16 -0.13 |
| 2 | Float | 0.3 | 0.08 -0.06 | 0.16 -0.13 |
| 3 | Broken | 0.3 | 0.06 -0.04 | 0.11 -0.06 |
| 4 | Float | 0.3 | 0.08 -0.06 | 0.16 -0.13 |

EXAMPLES 7 to 9 and Comparative Examples 5 to 7

Sheets having different plastic deformation ratios and elongation stresses at 30% stress were produced by varying the finishing conditions for the same material. These sheets were tested for heat moldability.

Sheets composed of fibers having an initial modulus of 1.5 to 0.42 g/de and an elongation of 55 to 70% both at 160° to 180° C. were obtained from the materials shown in Example 3 by the same process as in Example 3 except that the pressing temperature was different. The roll pressing temperatures, the plastic deformation ratios at 30% elongation, the elongation stresses at 30% elongation, and the results of the heat moldability test at varying molding temperatures are shown in Table 3.

In the heat moldability test, the same nonwoven fibrous web (A) as used in Example 1 was used, and a non-woven polypropylene fabric having a basis weight of 3 g/m² was used as an adhesive material.

It is seen from the results shown in Table 3 that satisfactory heat molded plates cannot be obtained unless the plastic deformation ratios and the elongation stresses at 30% elongation were within the ranges specified in the claims of the present application.

Table 3

| Example (Ex.) or Comparative Example (CEx.) | Roll pressing temperature (°C.) | Heat molding conditions mold temperature (°C.) Male mold | Heat molding conditions mold temperature (°C.) Female mold | Heat molding conditions pressing time (min.) | At the temperature of the male mold Plastic deformation ratio at 30% elongation (%) | At the temperature of the male mold Elongation stress at 30% elongation (kg/cm) | Heat moldability | Properties of the resulting shaped article Apparent density (g/cm³) | Properties of the resulting shaped article Flexural strength (kg/cm) | Properties of the resulting shaped article Modulus of elasticity (kg/cm²) |
|---|---|---|---|---|---|---|---|---|---|---|
| Ex. 7 | 150 | 180 -160 | 235 | 1.5 | 77-76 | 0.06 -0.07 | ◎ | 0.3 | 0.06 -0.04 | 0.12 -0.04 |
| Ex. 8 | 155 | 180 -160 | 235 | 1.5 | 74-73 | 0.07 -0.09 | ◎ | 0.3 | 0.06 -0.04 | 0.12 -0.04 |
| Ex. 9 | 160 | 180 -160 | 235 | 1.5 | 70-69 | 0.12 -0.13 | ◯ (Float) | 0.3 | 0.06 -0.04 | 0.12 -0.04 |
| CEx. 5 | 165 | 160 -180 | 235 | 3 -1.5 | 63-60 | 0.16 -0.15 | Float | 0.3 | 0.06 -0.04 | 0.12 -0.04 |
| CEx. 6 | 170 | 160 -180 | 235 | 3 -1.3 | 60-55 | 0.17 -0.16 | Float | 0.3 | 0.06 -0.04 | 0.12 -0.04 |
| CEx. 7 | 175 | 160 -180 | 235 | 3 -1.5 | Broken | Broken at 0.16 kg/cm | Broken | 0.3 | 0.06 -0.04 | 0.12 -0.04 |

In Comparative Examples 5, 6 and 7, the temperature of the male mold was increased to 185° C. The nonwoven fabric melt-adhered to the mold. The shaped article after heat molding had a thickness of 4 mm.

The nonwoven fibrous sheet (B) used had a compression stress at 10% compression of 6.5 to 4.0 g/cm² within the temperature range of the male mold.

EXAMPLES 10 to 12 and Comparative Examples 8 to 10

Using (S) PET-PF28/PET-DF1 of Example 2 as nonwoven fibrous sheet (B) and the same nonwoven fibrous web (A) as used in Example 1, heat molding was performed under the conditions shown in Table 4. The initial moduli and elongations of the constituent fibers and the plastic deformation ratios at 30% elongation and elongation stresses at 30% elongation of the sheet (B) at the molding temperatures are shown in Table 4 together with the results obtained.

A nonwoven polyethylene fabric having a basis weight of 3 g/m² was used as an adhesive material. Heat molding was performed so that the resulting shaped article had a thickness of 6 mm.

It is seen from the data shown in Table 4 that the heat moldability was poor (mainly floating occurred) when the stress of the fibrous sheet (B) at 30% elongation was outside the range specified in the claims with the other factors being within the ranges specified in the claims.

Table 4

| Example (Ex.) or Comparative Example CEx. | Heat molding conditions mold temperature (°C.) Male mold | Heat molding conditions mold temperature (°C.) Female mold | Heat molding conditions pressing time (min.) | Initial modulus of fibers (g/de) | Elongation of fibers (%) | Plastic deformation ratio of sheet at 30% elongation (%) | Stress at 30% elongation of sheet (kg/cm) |
|---|---|---|---|---|---|---|---|
| Ex. 10 | 190 | 235 | 1 | 0.6 | 60 | 72 | 0.06 |
| Ex. 11 | 180 | 235 | 1.5 | 1.2 | 55 | 72 | 0.08 |
| Ex. 12 | 170 | 235 | 1.5 | 1.9 | 50 | 68 | 0.11 |
| CEx. 8 | 160 | 235 | 2.0 | 2.6 | 50 | 65 | 0.16 |
| CEx. 9 | 150 | 235 | 2.0 | 3.2 | 46 | 63 | 0.18 |
| CEx. 10 | 140 | 235 | 5.0 | 4.0 | 45 | 60 | 0.20 |

| Example (Ex.) or Comparative Example (CEx.) | Heat moldability | Properties of the shaped article Apparent density (g/cm³) | Properties of the shaped article Flexural strength (kg/cm) | Properties of the shaped article Modulus of elasticity (kg/cm²) |
|---|---|---|---|---|
| Ex. 10 | ◎ | 0.2 | 0.07 | 0.13 |
| Ex. 11 | ◎ | 0.2 | 0.05 | 0.08 |
| Ex. 12 | ◎ | 0.2 | 0.04 | 0.07 |
| CEx. 8 | Float | 0.2 | 0.03 | 0.06 |
| CEx. 9 | Float | 0.2 | 0.02 | 0.05 |
| CEx. 10 | Float | 0.2 | 0.02 | 0.05 |

EXAMPLES 13 and 14 and Comparative Examples 11 and 12

(S)PET-PF28/PET-DF1 used as the nonfibrous sheet in Example 2 and a fibrous nonwoven web having a basis weight of 940 g/m² were combined, and tested for heat moldability. The fibrous nonwoven web was prepared from 80% of glass fibers having a diameter of 8 microns and 20% of uncured phenolic resin powder. A nonwoven polypropylene fabric having a basis weight of 3 g/m² was used as an adhesive material. The male mold was maintained at 190° C., and the female mold, at 235° C. The molding time was 1 minute. The thickness of the resulting shaped article was 15 mm.

In the heat moldability test, the compression stress at 10% compression of the nonwoven fibrous web was varied (that is, its apparent density was varied), and the occurrence of creases was observed. The results are shown in Table 5.

It is clearly seen from the data shown in Table 5 that the occurrence of creases is reduced when S/T is less than 0.03.

fabric having a basis weight of 3 g/m² was usd as an adhesive material. The molding was performed for 1 minute while maintaining the temperature of the male mold at 180° C. and the temperature of the female mold at 220° C. The thickness of the shaped plate was 23 mm.

As shown in Table 6, the occurrence of creases was reduced when S/T is less than 0.03.

Table 6

| Example (Ex.) or Comparative Example (CEx.) | Basic weight of the fibrous sheet (B) (g/m²) | Stress at 10% compression(T) (g/cm²) | Stress at 30% elongation(S) (kg/cm) | shaped S/I | Occurrence of creases in the density article | Properties of the shaped article | | |
|---|---|---|---|---|---|---|---|---|
| | | | | | | Apparent strength (g/cm³) | Flexural elasticity (kg/cm) | Modulus of (kg/cm²) |
| Ex. 15 | 25 | 3.7 | 0.036 | 0.0097 | No | 0.033 | 0.06 | 0.10 |
| Ex. 16 | 50 | 3.7 | 0.072 | 0.019 | No | 0.033 | 0.06 | 0.11 |
| CEx. 13 | 75 | 3.7 | 0.112 | 0.03 | Yes | 0.033 | 0.07 | 0.11 |
| CEx. 14 | 100 | 3.7 | 0.15 | 0.040 | Yes | 0.033 | 0.08 | 0.12 |

EXAMPLE 17

In the production of (S)(Ny-6)-PF24 used in Example 3, a silicone oil was applied to one surface layer in an amount of 3% based on the entire total weight of the nonwoven fibrous sheet, followed by extending and pressing. The resulting nonwoven fibrous sheet had a metal adhesion strength at 190° C. of 7 g/cm². When it was tested for heat moldability in the same way as in Example 3, the result was rated "◎" at a temperature of up to 190° C.

The nonwoven fibrous sheet note coated with the silicone oil showed a rating of "◎" only at a temperature of up to 183° C., and at 185° C., its metal adhesion strength exceeded 7 g/cm².

Table 5

| Example (Ex.) or Comparative Example (CEx.) | Apparent density of Fibrous sheet (A) (g/cm³) | Stress at 10% compression(T) g/cm² | Stress at 30% elongation(S) (kg/cm) | S/T | Occurrence of creases in the shaped article | Properties of the shaped article | | |
|---|---|---|---|---|---|---|---|---|
| | | | | | | Apparent density (g/cm³) | Flexural strength (kg/cm) | Modulus of elasticity kg/cm² |
| Ex. 13 | 0.042 | 9.5 | 0.06 | 0.0063 | No | 0.062 | 0.05 | 0.11 |
| Ex. 14 | 0.016 | 2.16 | 0.06 | 0.028 | No | 0.062 | 0.05 | 0.11 |
| CEx. 11 | 0.013 | 1.73 | 0.06 | 0.036 | Yes (8 creases occurred on the circumference of the bottom of the circular truncated cone) | 0.062 | 0.06 | 0.11 |
| CEx. 12 | 0.009 | 1.30 | 0.06 | 0.046 | Yes (8 creases occurred on the circumference of the bottom of the circular truncated cone) | 0.062 | 0.05 | 0.11 |

EXAMPLES 15 and 16 and Comparative Examples 13 and 14

A nonwoven fibrous web composed of 50% of wool, 30% of cotton and 20% of uncured phenolic resin powder and having a basis weight of 750 g/m², an apparent density of 0.025, and a compression stress at 10% compression at 180° C. of 3.7 g/cm² was combined with each of nonwoven fibrous sheets having a basis weight of 25, 50, 75 and 100 g/m² which were the same as (S) PET-PF28/PET-DF1 used in Example 2 except that the number of laminations of PET-PF was varied, and tested for moldability. A nonwoven polypropylene

EXAMPLE 18

The nonwoven fibrous sheets used in Examples 2, 3, 4 and 6 were found to have a metal adhesion strength of not more than 7 g/cm² at the temperature of the heat molding.

EXAMPLE 19

In the production of (S)PET-PF28/PET-DF1 used in Example 2, a suspension of a fire retardant composed of 50% of decabromodiphenyl ether, 45% of liquid paraffin and 5% of graphite was applied to the inter-layer in an amount of 60% based on the weight of the nonwoven fibrous sheet, followed by extending and pressing. Through a non-woven polypropylene fabric having a basis weight of 6 g/m² as an adhesive material, the resulting sheet (B) was bonded to one surface of a glass mat having a basis weight of 1,000 g/m², a thickness of 3 cm and a fiber diameter of 7 microns while heat molding it in a raised and depressed profile under the following conditions.

Temperature of a mold on the side of the nonwoven fibrous sheet: 185° C.
Temperature of a mold on the side of the glass mat: 220° C.
Molding thickness (plain region): 2 cm
Molding time: 2 minutes The resulting shaped article having aesthetic characteristic had an average apparent density of 0.07 g/cm³, a ratio of depressed portions to raised portions of 1.1, a flexural strength of 0.08 kg/cm, a flexural modulus of 0.08 kg/cm² and a sound absorption ratio at 3,000 Hz of 75%. It was favorably used as a soundproofing mat on an engine hood of an automobile.

A rectangular sample, 10 cm × 30 cm, was cut out from the plain region of the resulting shaped article, and evaluated in accordance with FMVSS 302 with the sheet (B) facing downward. It was found to be "self-extinguishing".

EXAMPLE 20

A blend of 79.5% of polybutylene terephthalate chips having an intrinsic viscosity [η] of 1.1, 19.2% of polypropylene chips having an intrinsic viscosity [η] of 2.0, 0.3% of carbon black and 1.0% of talc was dried in the same way as in Example 1, and fed into a screw to melt it. Nitrogen was blown into the screw and kneaded with the molten mixture. The kneaded mixture was passed over a mandrel, and extruded at a rate of 57 g/min. from a ring die having a slit width of 0.25 mm and a diameter of 16 cm. While being cooled with cooling air, the extrudate was taken up at a rate of 50 m/min. to form a reticulated fibrous sheet (PF) having a fiber diameter of 43 microns and an average distance between interlocked points of 10 mm and containing numerous cracks in the taken-up direction.

Thirty-four (PF) sheets were laminated, and the laminate was fed at an overfeed ratio of 1.9, extended to 10 times the original dimension in the transverse direction, and pressed at 150° C. and 12 kg/cm² to afford a nonwoven fibrous sheet (B) having a basis weight of 41 g/m² and a thickness of 105 microns.

The fibers of the nonwoven fibrous sheet (B) had an initial modulus of 1.2 g/de and an elongation of 43% at 185° C., and the nonwoven fibrous sheet (B) had a plastic deformation ratio at 30% elongation of 74%, and an elongation stress at 30% elongation of 0.073kg/cm, both at 185° C.

The same suspension of a fire retardant as used in Example 19 was applied to the nonwoven fibrous sheet (B) in an amount of 35% based on the weight of the sheet and 5% of a silicone oil was coated on it to increase its water repellency. The sheet (B) was then bonded to TACA No. 812 (a nonwoven fibrous web composed of organic fibers with a heat curing agent and having a basis weight of 1,200 g/m²; a product of Nippon Tokushu Toryo K.K.) through a nonwoven polypropylene fabric having a basis weight of 6 g/m² as an adhesive material while heat molding it so that the ratio of depressed portions to raised portions of the entire shaped article became 1.25. The heat molding conditions were as follows.

Temperature of a mold on the side of the nonwoven fibrous sheet (B): 185° C.
Temperature of a mold on the side of TACA No. 812: 235° C.
Molding thickness (plain region): 4.5 mm
Molding time: 1 minute The resulting fibrous shaped article showed aesthetic beauty and had an average apparent density of 0.21 g/cm³, a flexural strength of 0.06, a flexural modulus of 0.12 kg/cm², and a second absorption ratio (measured with the provision of a 5 cm air layer) at 3,000 Hz of 73%. The shaped article was suitable as a soundproofing mat for an engine hood of an automobile.

A rectangular sample, 10 cm × 30 cm, was cut out from the plain region of the resulting fibrous shaped article, and tested for fire retardancy in accordance with JIS D1201 with the sheet (B) facing downward. It was found to be "self-extinguishing".

What we claim is:

1. A fibrous shaped article having a surface with raised and depressed portions, said fibrous article consisting of a unitary laminated structure resulting from the compression molding under heat of (A) a heat compression-moldable nonwoven fibrous web and (B) a nonwoven fibrous sheet, said fibrous sheet (B) being laminated to at least one surface of said fibrous web (A); said fibrous web (A) having a compression stress, at 10% compression at the temperature of said compression molding, of at least 0.5 g/cm²; said nonwoven fibrous sheet (B) consisting of a continuous unitary reticulated sheet structure of an assembly of many fibers of a thermoplastic polymer, said constituent fibers having both an initial modulus of not more than 5 g/denier and an elongation of at least 20%, at the temperature of said compression molding and being interconnected in a spaced-apart relationship, and said nonwoven fibrous sheet (B) having a plastic deformation ratio, at 30% elongation at the temperature of said compression molding, of at least 50% and an elongation stress, at 30% elongation at the temperature of said compression molding, of not more than 0.15 kg/cm; and said web (A) and said sheet (B) satisfying the following relation:

$$S \leq 0.03T$$

in which T is the compression stress (g/cm²) of said web (A) at 10% compression at the temperature of said compression molding, and S is the elongation stress (kg/cm) of said sheet (B) at 30% elongation at the temperature of said compression molding and said fibrous shaped article having an air permeability of more than 2 ml.cm$^{-2}$.sec$^{-1}$, a sound absorption ratio of more than 3% at 100–500 Hz, more than 3% at 500–2000 Hz and more than 30% at more than 2000 Hz, a flexural strength of more than 0.03 kg.cm$^{-1}$, and a modulus of elasticity of more than 0.04 kg.cm$^{-2}$.

2. The article of claim 1 wherein said web (A) has a compression stress, at 10% compression at the temperature of said compression molding, of at least 1.0 g/cm².

3. The article of claim 1 wherein said web (A) has a thickness of about 5 mm to about 60 mm.

4. The article of claim 1 wherein said web (A) has a thickness of about 10 mm to about 40 mm.

5. The article of claim 1 wherein said web (A) has an apparent density of about 0.005 to about 0.15 g/cm³.

6. The article of claim 1 wherein said web (A) is composed of inorganic or organic natural, regenerated or synthetic fibers having a melting temperature of at least 200° C.

7. The article of claim 1 wherein said web (A) contains a resinous binder.

8. The article of claim 7 wherein the amount of said resinous binder is at least 5% by weight based on the weight of said web (A).

9. The article of claim 7 wherein said resinous binder is a thermosetting resin which cures at the temperature of said compression molding.

10. The article of claim 1 wherein said nonwoven fibrous sheet (B) has a basis weight of 15 to 150 g/m$^2$.

11. The article of claim 1 wherein said nonwoven fibrous sheet (B) has a tensile strength of at least 0.1 kg/cm.

12. The article of claim 1 wherein said nonwoven fibrous sheet (B) has an elongation of at least 5%.

13. The article of claim 1 wherein said nonwoven fibrous sheet (B) has an apparent density of about 0.2 to about 0.6 g/cm$^3$.

14. The article of claim 1 wherein the average distance between the interconnected points of the individual fibers of the reticulated sheet structure is from 1 mm to 50 mm.

15. The article of claim 1 wherein the individual consistuent fibers of said fibrous assembly have an initial modulus of not more than 3 g/denier and an elongation of at least 25%, both at the temperature of said compression molding.

16. The article of claim 1 wherein said reticulated sheet structure is a laminate of at least two thin fibrous sheets which have been stretched in a direction substantially at right angles to the axes of the constituent fibers, each of said thin fibrous sheets being an assembly of many fibers of a thermoplastic polymer, the individual fibers having both an initial modulus of not more than 5 g/denier and an elongation of at least 20% at the temperature of said compression molding and being aligned in a substantially fixed direction substantially two-dimensionally, said individual fibers being interconnected at random in a spaced-apart relationship.

17. The article of claim 16 wherein said thin fibrous sheet is produced by extruding a foamable melt of a thermoplastic polymer through an elongate slit having a narrow clearance not exceeding 500 microns to foam it, and drafting the extrudate at a draft ratio between the maximum draft ratio possible under the conditions and one-third thereof while quenching it near the exit of said slit, thereby to fibrillate extrudate.

18. The article of claim 1 wherein said nonwoven fibrous sheet (B) has a plastic deformation ratio, at 30% elongation at the temperature of said compression molding, of at least 60%.

19. The article of claim 1 wherein said nonwoven fibrous sheet (B) has an elongation stress, at 30% elongation at the temperature of said molding, of not more than 0.1 kg/cm.

20. The article of claim 1 wherein said web (A) and said sheet (B) have the following relation:

$S \leq 0.025T$.

21. The article of claim 1 wherein said nonwoven fibrous sheet (B) has a melting temperature of at least 200° C.

22. The article of claim 1 wherein said nonwoven fibrous sheet (B) is fire-retardant.

23. The article of claim 1 wherein a polymeric sheet (C) capable of melting at the temperature of said compression molding is interposed between said web (A) and said sheet (B).

24. The article of claim 1 wherein the total surface area of that side of said fibrous shaped article which is covered with said sheet (B) is 1.01 to 2.0 times the total surface area of the same side of the laminated structure before molding.

25. The article of claim 1 which has a density of 0.02 to 0.5 g/cm$^3$.

26. In a process for producing a fibrous shaped article having a surface with raised and depressed portions which comprises superposing a non-woven fibrous sheet (B) on at least one surface of a heat compression-moldable nonwoven fibrous web (A) and compression-molding the resulting laminate under heat; the improvement wherein said nonwoven web (A) has a compression stress, at 10% compression at the temperature of said compression molding, of at least 0.5 g/cm$^2$; said nonwoven fibrous sheet (B) consists of a continuous unitary reticulated sheet structure of an assembly of many fibers of a thermoplastic plymer, said constituent fibers having both an initial modulus of not more than 5 g/denier and an elongation of at least 20%, at the temperature of said compression molding and being interconnected in a spaced-apart relationship, and said nonwoven fibrous sheet (B) has a plastic deformation ratio, at 30% elongation at the temperature of said compression molding, of at least 50% and an elongation stress, at 30% elongation at the temperature of said compression molding, of not more than 0.15 kg/cm; and said web (A) and said sheet (B) satisfy the following relation:

$S \leq 0.03T$ in which T is the compression stress (g/cm$^2$) of the web (A) at 10% compression at the temperature of said compression molding, and S is the elongation stress (kg/cm) of the nonwoven sheet (B) at 30% elongation at the temperature of said compression molding and said fibrous shaped article having an air permeability of more than 2 ml.cm$^{-2}$.sec$^{-1}$, a sound absorption ratio of more than 3% at 100–500 Hz, more than 3% at 500–2000 Hz and more than 30% at more than 2000 Hz, a flexural strength of more than 0.03 kg.cm$^{-1}$, and a modulus of elasticity of more than 0.04 kg.cm$^{-2}$.

27. The article of claim 1 wherein said fibrous shaped article has an air permeability of more than 10 ml.cm$^{-2}$.sec$^{-1}$.

28. The article of claim 1 wherein said fibrous shaped article has a sound absorption ratio of more than 5% at 100–500 Hz, more than 5% at 500–2000 Hz, and more than 70% at more than 2000 Hz.

29. The article of claim 1 wherein said fibrous shaped article has a flexural strength of more than 0.05 kg.cm$^{-1}$.

30. The article of claim 1 wherein said fibrous shaped article has a modulus of elasticity of more than 0.08 kg.cm$^{-2}$.

* * * * *